US012081907B2

(12) United States Patent
Desai et al.

(10) Patent No.: US 12,081,907 B2
(45) Date of Patent: Sep. 3, 2024

(54) ELECTRONIC DEVICE WITH NON-PARTICIPANT IMAGE BLOCKING DURING VIDEO COMMUNICATION

(71) Applicant: MOTOROLA MOBILITY LLC, Wilmington, DE (US)

(72) Inventors: Rahul B. Desai, Hoffman Estates, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 252 days.

(21) Appl. No.: 17/399,377

(22) Filed: Aug. 11, 2021

(65) Prior Publication Data

US 2023/0045989 A1 Feb. 16, 2023

(51) Int. Cl.
| | |
|---|---|
| *H04N 7/15* | (2006.01) |
| *G06F 3/16* | (2006.01) |
| *G06V 40/16* | (2022.01) |
| *G10L 15/08* | (2006.01) |
| *H04L 12/18* | (2006.01) |

(Continued)

(52) U.S. Cl.
CPC ............ *H04N 7/157* (2013.01); *G06F 3/165* (2013.01); *G06V 40/172* (2022.01); *G10L 15/083* (2013.01); *H04L 12/1822* (2013.01); *H04L 12/1831* (2013.01); *H04N 5/2621* (2013.01); *H04N 23/69* (2023.01); *H04N 23/695* (2023.01)

(58) Field of Classification Search
CPC ...... H04N 7/157; H04N 5/2621; H04N 23/69; H04N 23/695; H04L 12/1822; H04L 12/1831; G06V 40/172; G06F 3/165; G10L 15/083
See application file for complete search history.

(56) References Cited

U.S. PATENT DOCUMENTS 11,182,879 B1 * 11/2021 Haslam ................ G06V 40/172
11,350,059 B1 * 5/2022 Swierk ................. G06T 7/0002
(Continued)

OTHER PUBLICATIONS

Zhang et al., "Light Weight Background Blurring for Video Conferencing Applications", International Conference on Image Processing, IEEE, Oct. 2006.

*Primary Examiner* — Azizul Choudhury
(74) *Attorney, Agent, or Firm* — Isidore PLLC (57) ABSTRACT

An electronic device, computer program product, and method avoids presenting certain objects during a video communication session. During a video communication session with second electronic device(s), a controller of an electronic device identifies baseline image(s) from an image stream provided by an image capturing device of the electronic device. The baseline image includes a primary image portion of participant(s) and including a scene of objects within the foreground or background of participant (s), during an initial portion of the video communication session. The controller monitors the image stream for a subsequent detection of the primary image portion and of non-participant(s) or object(s) as a secondary image portion that is not included within the baseline image(s). The controller responds to detecting the secondary image portion subsequently appearing within the image stream by communicating, to the one or more second electronic devices, a substitute image stream that does not present the secondary image portion.

16 Claims, 8 Drawing Sheets

(51) Int. Cl.
  *H04N 5/262* (2006.01)
  *H04N 23/69* (2023.01)
  *H04N 23/695* (2023.01)

(56) References Cited

U.S. PATENT DOCUMENTS

| | | | |
|---|---|---|---|
| 11,451,746 B1* | 9/2022 | Graybill | G06T 3/00 |
| 2012/0327172 A1* | 12/2012 | El-Saban | G06T 7/174 |
| | | | 348/14.02 |
| 2013/0169844 A1* | 7/2013 | Watts | G06T 15/04 |
| | | | 348/239 |
| 2016/0173821 A1* | 6/2016 | De Magalhaes | H04N 23/61 |
| | | | 348/14.08 |
| 2021/0400142 A1* | 12/2021 | Jorasch | H04L 65/1069 |
| 2022/0052986 A1* | 2/2022 | Bran | G06F 21/84 |
| 2022/0256116 A1* | 8/2022 | Chu | H04N 7/147 |
| 2022/0350925 A1* | 11/2022 | Alexander | G06N 20/00 |

* cited by examiner

ELECTRONIC DEVICE WITH NON-PARTICIPANT IMAGE BLOCKING DURING VIDEO COMMUNICATION

BACKGROUND

1. Technical Field

The present disclosure relates generally to electronic devices that support and/or enable video communication sessions using a camera and a microphone, and more particularly to electronic devices that support and/or enable video communication sessions with capability to change or modify the image stream being communicated.

2. Description of the Related Art

User communication devices such as mobile phones, desktop workstations, laptops, and tablets are often equipped with a front side camera and a microphone to enable online human communication. Microphones and cameras can also be incorporated as peripheral devices. So as to simulate an in-person conversation, meeting, or lecture, each participant in a video communication session generally positions themself within the field of view of the local camera and within detection range of the microphone. The respective image and audio streams are communicated to the video communication session for presentation by one or more second electronic devices. Recent trends indicate an increased use of video communications in a wide range of settings including homes and public spaces. Unlike dedicated conference rooms, these open areas allow for uninvited people and pets to make an unplanned entrance and become visible within the field of view of the camera and/or audible within the detection range of the microphone. Some people opportunistically intrude on the image stream, leading to the term "photobombing" to be coined for such occurrences during the taking of photos in public spaces. These photobombing instances are distracting to other participants in the video conference session and can be embarrassing for the local participant. Turning off the camera all of the time to avoid the problem degrades the user experience for other participants in the video conference session and reduces the local participant's opportunity to interact with the other participants.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present disclosure, an electronic device, a computer program product, and a method are provided that autonomously blocks presentation of non-participants from appearing within an image stream transmitted during a video communication session from the electronic device to one or more second electronic devices. The electronic device includes at least one image capturing device that provides an image stream. The electronic device includes a controller that is communicatively coupled to the at least one image capturing device. During a video communication session with one or more second electronic devices, the controller identifies at least one baseline image from the image stream, including a primary image portion of at least one participant and including a scene of objects within the foreground and background of the at least one participant, during an initial portion of the video communication session. The controller monitors the image stream for a subsequent detection of the primary image portion and of at least one non-participant or object as a secondary image portion that is not included within the baseline image. The controller responds to detecting the secondary image portion subsequently appearing within the image stream by communicating, to the one or more second electronic devices, a substitute image stream that does not present the secondary image portion.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 1:
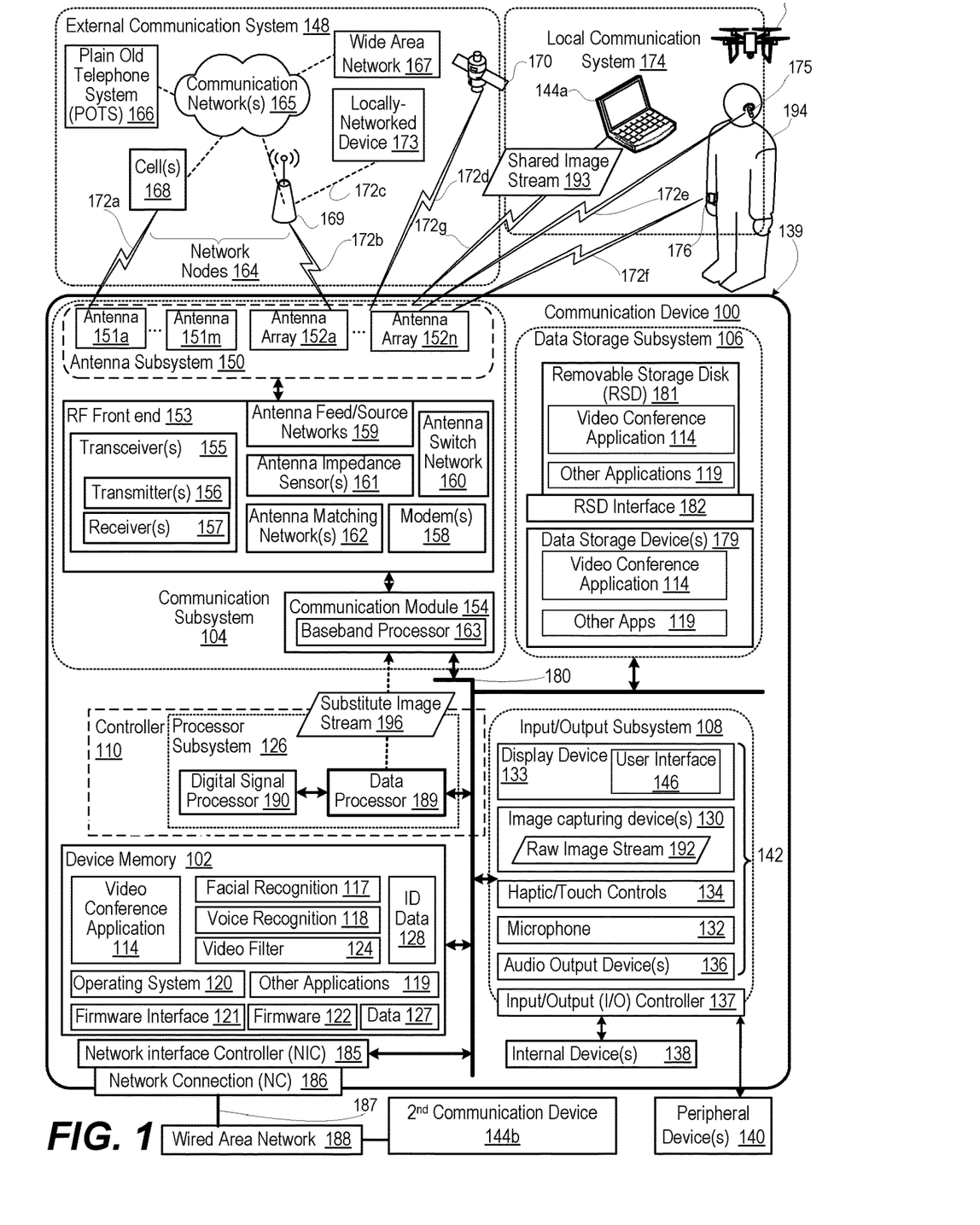
FIG. 1 depicts a functional block diagram of a communication environment including a communication device having components that respond to block a non-participant appearing in a field of regard of an image capturing device during a video communication session, and within which the features of the present disclosure are advantageously implemented, according to one or more embodiments.

FIG. 1 depicts an operating environment having a functional block diagram of an electronic device, specifically communication device 100, within which several of the features of the present disclosure are advantageously implemented. Referring to the specific component makeup and the associated functionality of communication device 100 of FIG. 1. In one or more embodiments, communication device 100 has device memory 102, communication subsystem 104, data storage subsystem 106, and input/output (I/O) subsystem 108. Device memory 102 and each subsystem (104, 106, and 108) are managed by controller 110. Device memory 102 includes program code for applications, such as video conference application 114, facial recognition utility 117, voice recognition utility 118, and other application(s) 119. In an example, facial recognition utility 117 can merely recognize a generic shape of a human face to distinguish an object from animals or inanimate objects. In another example, facial recognition utility 117 can recognize an orientation of a human face for determining what a person is looking at or speaking to. In an additional example, facial recognition utility 117 can recognize a particular human face as unique from other human faces for purposes of identifying a person. In a further example, facial recognition utility 117 can employ optical or infrared sensing to detect a two-dimensional or three-dimensional shape of a face. In one or more embodiments, facial recognition utility 117 includes range finding and direction finding capabilities to identify a relative position between participant and a non-participant. Device memory 102 further includes operating system (OS) 120, firmware interface 121, such as basic input/output system (BIOS) or Uniform Extensible Firmware Interface (UEFI), and firmware 122. Device memory 102 can include a video filter 124 as an add-on to video conference application 114 that substitutes a different background in an image stream.

Controller 110 includes processor subsystem 126 that executes program code to provide operating functionality of communication device 100. The software and/or firmware modules have varying functionality when their corresponding program code is executed by processor subsystem 126 or secondary processing devices within communication device 100. Processor subsystem 126 of controller 110 can execute program code of video conference application 114 and other applications 119 to configure communication device 100 to perform specific functions. Device memory 102 can include data 127 used by the applications, such as identification (ID) data 128 for identifying a particular person using facial or voice recognition utilities 117 and 118.

I/O subsystem 108 includes user interface components such as image capturing device 130, microphone 132, display device 133, touch/haptic controls 134, and audio output device(s) 136. I/O subsystem 108 also includes I/O controller 137. I/O controller 137 connects to internal devices 138, which are internal to housing 139, and to peripheral devices 140, such as external speakers, which are external to housing 139 of communication device 100. Internal devices 138 include computing, storage, communication, or sensing components depicted within housing 139. I/O controller 137 supports the necessary configuration of connectors, electrical power, communication protocols, and data buffering to act as an interface between internal devices 138 and peripheral devices 140 and other components of communication device 100 that use a different configuration for inputs and outputs.

Communication device 100 is managed by controller 110, which is communicatively coupled to image capturing device 130 and to at least one user interface device 142, such as at least one microphone 132. Image capturing device 130 and user interface device 142 allows a participant using communication device 100 to be an active participant in a video communication session with a second participant using a second communication device 144. Controller 110 is also communicatively coupled to at least one display device 133 that presents user interface 146 for the video communication session. Controller 110 executes video conference application 114 stored in device memory 102 to configure communication device 100 to enable communication with second communication device 144a/144b in the video communication session. It is appreciated that second communication device 144a/144b can be similarly configured and/or provide similar functionality as communication device 100. Communication device 100 is configured to monitor, during the video communication session with one or more second communication devices 144a/144b, an image stream from the at least one image capturing device 130 for a secondary image portion containing uninvited or non-participant persons and objects that suddenly appear within the image stream and that are not part of the expected participant(s) and/or baseline foreground and background images of the image stream.

According to one aspect, during an initial portion of a video communication session, communication device 100 identifies a baseline image containing a primary image portion of a local participant to the video communication session. The baseline image is presumed to not include a secondary image portion of a non-participant such as at least one person, animal, or moving object. A baseline image includes a primary image portion of at least one participant within a scene of foreground and/or background objects during an initial portion of the video communication session. The participant can be identified by using facial recognition utility 117 in device memory. Alternatively, and/or in addition, communication device 100 can associate a voice pattern with the at least one participant, using voice recognition utility 118 in device memory 102. Communication device 100 monitors the image stream for the appearance of a secondary image portion containing a non-participant within the image stream. Examples of non-participants include at least one of uninvited person, pets, and automated toys such as aerial drones and remote-control cars. In response to detecting the secondary image portion subsequently appearing within the image stream, communication device 100 communicates a substitute image stream that does not present the secondary image portion to the one or more second communication devices 144a/144b.

Each of communication device 100 and second communication devices 144a-144b can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Referring now to the communication components and features of communication device 100. Communication subsystem 104 of communication device 100 enables wireless communication with external communication system 148. Communication subsystem 104 includes antenna subsystem 150 having lower band antennas 151a-151m and higher band antenna arrays 152a-152n that can be attached in/at different portions of housing 139. Communication subsystem 104 includes radio frequency (RF) front end 153 and communication module 154. RF front end 153 includes transceiver(s) 155, which includes transmitter(s) 156 and receiver(s) 157. RF front end 153 further includes modem(s) 158. RF front end 153 includes antenna feed/source networks 159, antenna switch network 160, antenna impedance sensor(s) 161, and antenna matching network(s) 162. Communication module 154 of communication subsystem 104 includes baseband processor 163 that communicates with controller 110 and RF front end 153. Baseband processor 163 operates in a baseband frequency range to encode data for transmission and decode received data, according to a communication protocol. Modem(s) 158 modulate baseband encoded data from communication module 154 onto a carrier signal to provide a transmit signal that is amplified by transmitter(s) 156. Modem(s) 158 demodulates each signal received by antenna subsystem 150 from external communication system 148. The received signal is amplified and filtered by receiver(s) 157, which demodulate received encoded data from a received carrier signal. Antenna feed/source networks 159 transmits or receives from particular portions of antenna subsystem 150 and can adjust a phase between particular portions of antenna subsystem 150. Antenna switch network 160 can connect particular combinations of antennas (151a-151m, 152a-152n) to transceiver(s) 155. Controller 110 can monitor changes in antenna impedance detected by antenna impedance sensor(s) 161 for determining portions of antenna subsystem 150 that are blocked. Antenna matching network(s) 162 are connected to particular lower band antennas 151a-151m to tune impedance respectively of lower band antennas 151a-151m to match impedance of transceivers 155. Antenna matching network(s) 162 can also be used to detune the impedance of lower band antennas 151a-151m to not match the impedance of transceivers 155 to electromagnetically isolate a particular antenna.

In one or more embodiments, controller 110, via communication subsystem 104, performs multiple types of over-the-air (OTA) communication with network nodes 164 of external communication system 148. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks. The particular network nodes 164 can be cellular "cells", base nodes, or base stations 168 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas 151a-151m are incorporated to support newer radio access technologies (RATs) and multi band operation. Dual low band (2 L) or quad low band (4 L) multiple input multiple output (MIMO) operation dictates multiple antennas communicate on multiple bands simultaneously.

In one or more embodiments, network nodes 164 can be access node(s) 169 that support wireless OTA communication. Communication subsystem 104 can receive OTA communication from location services such as provided by global positioning system (GPS) satellites 170. Communication subsystem 104 communicates via OTA communication channel(s) 172a with base stations 168. Communication subsystem 104 communicates via wireless communication channel(s) 172b with access node 169. In one or more particular embodiments, access node 169 supports communication using one or more IEEE 802.11 wireless local area network (WLAN) protocols. Wi-Fi is a family of wireless network protocols, based on the IEEE 802.11 family of standards, which are commonly used between user devices and network devices that provide Internet access. In one or more particular embodiments, communication subsystem 104 communicates with one or more locally networked devices 173 via wired or wireless link 172c provided by access node 169. Communication subsystem 104 receives downlink broadcast channel(s) 172d from GPS satellites 170 to obtain geospatial location information.

In one or more embodiments, controller 110, via communication subsystem 104, performs multiple types of OTA communication with local communication system 174. In one or more embodiments, local communication system 174 includes wireless headset 175 and smart watch 176 that are coupled to communication device 100 to form a personal access network (PAN). Communication subsystem 104 communicates via low power wireless communication channel(s) 172e with headset 175. Communication subsystem 104 communicates via second low power wireless communication channel(s) 172f, such as Bluetooth, with smart watch 176. In one or more particular embodiments, communication subsystem 104 communicates with second communication device(s) 144a via wireless link 172g to form an ad hoc network.

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as video conference application 114 and other application(s) 119 that use communication services. These applications can be loaded into device memory 102 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for video conference application 114 and other applications 119. When executed by controller 110, the program code causes or configures communication device 100 to block a secondary image portion of a non-participant from appearing in an image stream communicated to second communication devices 144a-144b in a video communication session, as described herein.

In one or more embodiments, I/O subsystem 108 includes network interface controller (NIC) 185 with a network connection (NC) 186 on housing 139. Network cable 187 connects NC 186 to wired area network 188. Wired area network 188 can be a local area network (LAN), a campus area network (CAN), a metropolitan area network (MAN), or a wide area network (WAN). For example, NC 186 can be an Ethernet connection. Second communication devices 144b is communicatively coupled to wired area network 188.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 126, which includes one or more central processing units (CPUs), depicted as data processor 189. Processor subsystem 126 can include one or more digital signal processors 190 that are integrated with data processor 189 or are communicatively coupled to data processor 189, such as baseband processor 163 of communication module 154. In one or embodiments that are not depicted, controller 110 can further include distributed processing and control components that are external to housing 139 or grouped with other components, such as I/O subsystem 108. Data processor 189 is communicatively coupled, via system interlink 180, to device memory 102. In one or more embodiments, controller 110 of communication device 100 is communicatively coupled via system interlink 180 to communication subsystem 104, data storage subsystem 106, and I/O subsystem 108.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 180) are illustrated in FIG. 1, it is to be understood that more, fewer, or different interconnections may be present in other embodiments.

Communication device 100 can support a video communication session with communication devices 144a-144b. Image capturing device 130 provides local and/or raw image stream 192. As an example, raw image stream 192 can incorporate a primary image portion that represents local participant 194. Controller 110 can select a local and/or raw image stream 192 to send to communication devices 144a-144b as shared image stream 193. According to aspects of the present innovation, controller 110 can detect that raw image stream 192 incorporates a secondary image portion that incorporates a non-participant 195 in addition to person 194. Non-participant 195 can be one or more persons, animals, or objects that can move into the field of view of image capturing device 130. In response to detecting the secondary image portion, controller 110 can generate or select substitute image stream 196 that is sent to communication devices 144a-144b as shared image stream 193. According to one embodiment, the substitute image stream 196 omits, or reduces the visibility of, the secondary image portion.

Figure 2A:
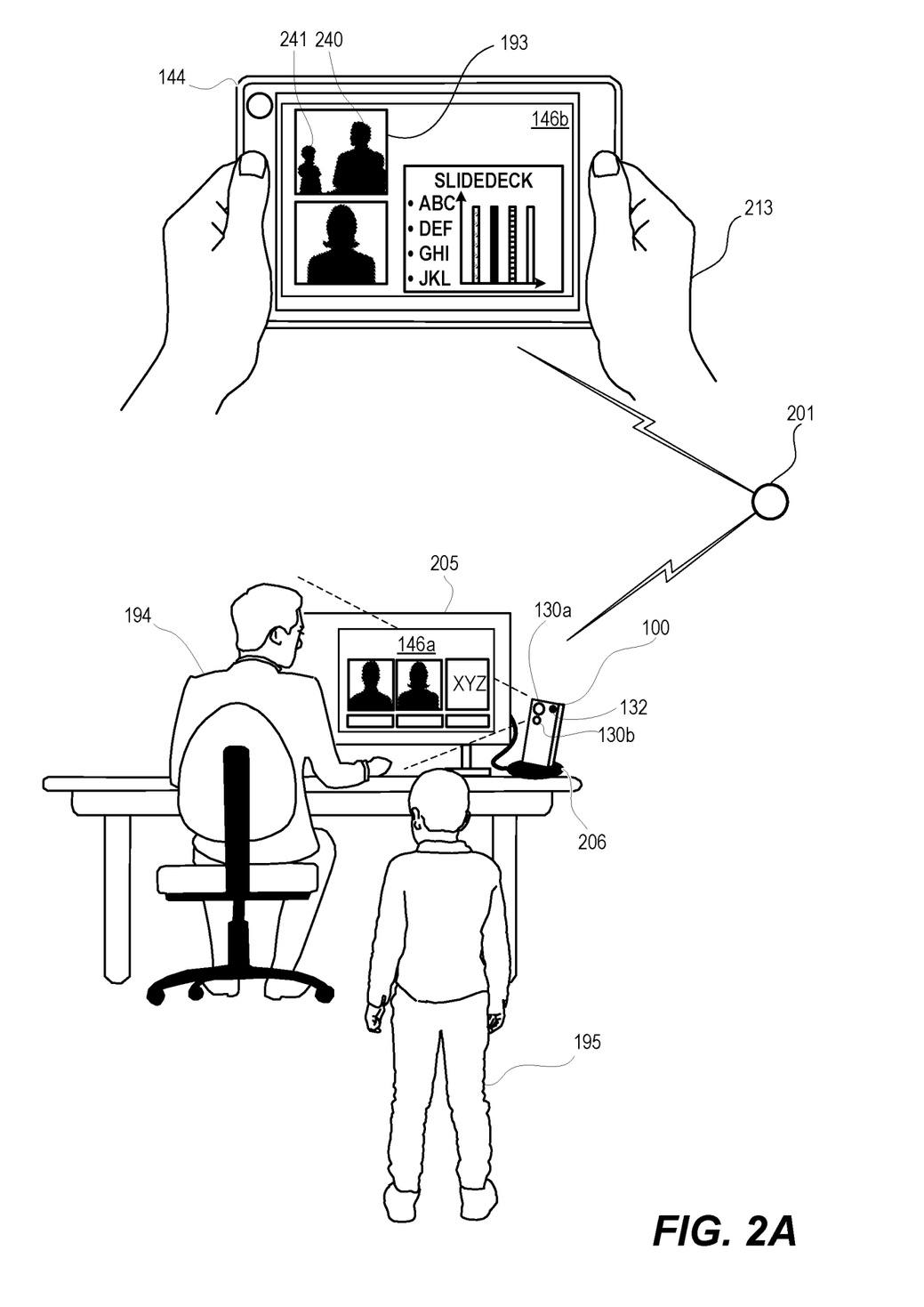
FIG. 2A depicts a front view of first and second communication devices respectively presenting a respective user interface for a video communication session, according to one or more embodiments.

FIG. 2A depicts a front view of first and second communication devices 100/144 respectively presenting a respective user interface 146a-146b for a video communication session. For clarity, only two communication devices 100/144 are depicted connected via network 201. In one or more embodiments, three or more communication devices can be connected to the video communication session. Local participant 194 views user interface 146a presented on external display device 205. In one or more embodiments, external display device 205 is a monitor, a laptop screen, a desktop workstation, or a tablet computer. Communication device 100, such as a smart phone, includes front image capturing device 130a that has a field of view that initially incorporates local participant 194. In one or more embodiments, communication device 100 is received in dock 206 that maintains positioning of image capturing device 130a. In one or more embodiments, dock 206 can provide power to communication device 100. In one or more embodiments, dock 206 can present a communication link to enable communication device 100 to be communicatively coupled to external display device 205. The field of view of front image capturing device 130a includes non-participant 195 who is photobombing the video communication session. Non-participant 195 can be an unintended or uninvited person, animal or movable object appears within the field of view of front image capturing device 130a.

User interface 146b presents shared image stream 193 that is received from communication device 100. Shared image stream 193 is a substantively unaltered version of local and/or raw image stream 192 (FIG. 1) provided by image capturing device 130a to controller 110 (FIG. 1) of communication device 100. Shared image stream 193 includes primary image portion 240 representing local participant 194 and secondary image portion 241 representing non-participant 195, such as an uninvited person. The presentation of secondary image portion 241 depicting non-participant 195, which can be an unintended/uninvited person, pet, or object is distracting and can degrade the user experience of remote participant 213 and others participating in the video communication session. Local participant 194 may be unaware of a presence of the non-participant 195. Depending on a selected arrangement of user interface 146a, local participant 194 may not see secondary image portion 241 incorporated in shared image stream 193. Even if aware, local participant 194 may also find it inconvenient to turn off front image capturing device 130a. Thus, local participant 194 either fails to mitigate the distraction or can be simply unaware and fail to remove/mitigate the distraction for a period of time.

Figure 2B:
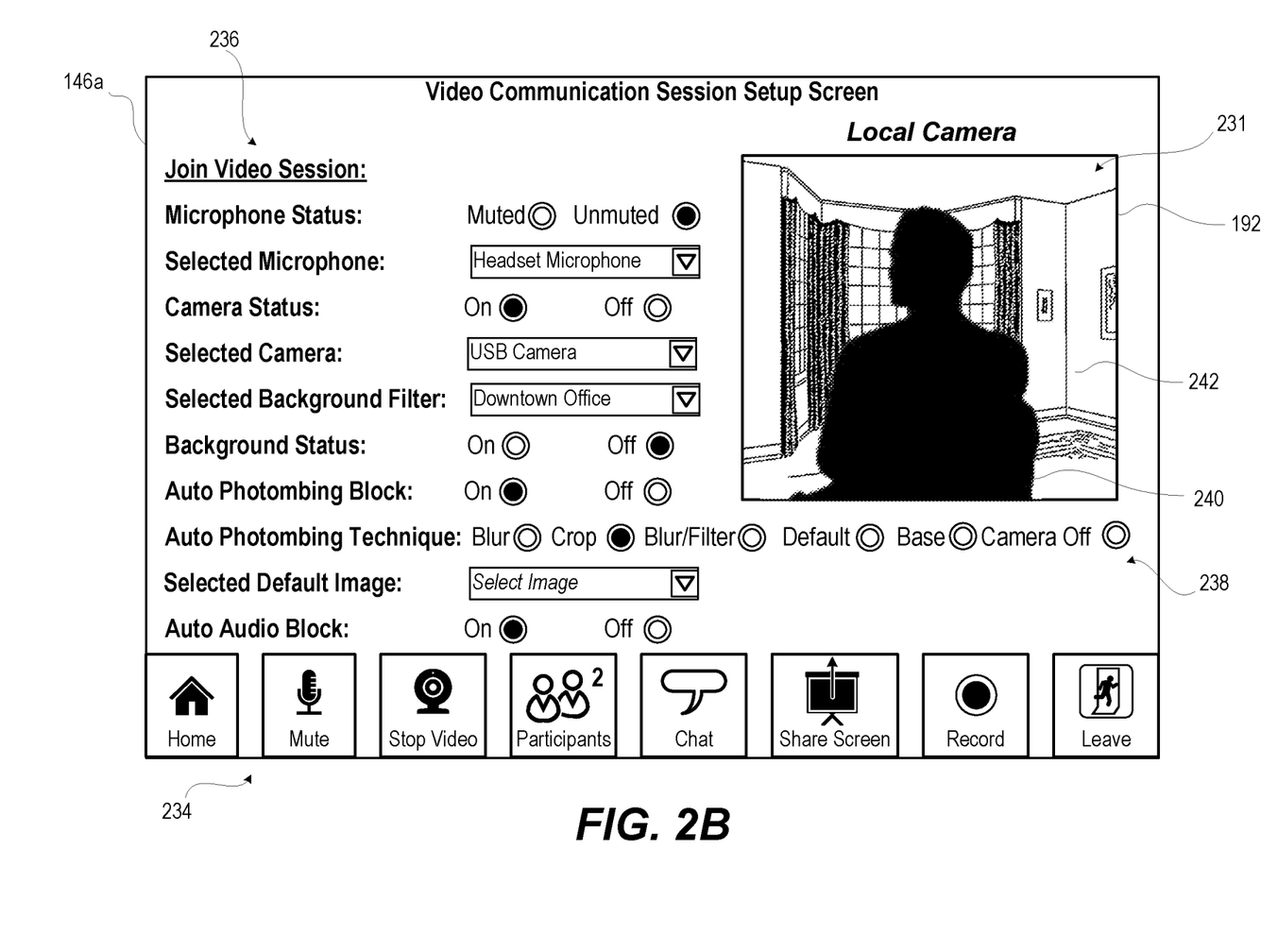
FIG. 2B depicts a user interface presented by the first communication device that includes a baseline image of a participant incorporated in an image stream from the image capturing device, according to one or more embodiments.

FIG. 2B depicts user interface 146a presented by first communication device 100 (FIG. 2A) that includes baseline image 231 in local and/or raw image stream 192 from image capturing device 130 (FIG. 2A). Baseline image 231 occurs before secondary image portion 241 has become incorporated into local and/or raw image stream 192 in FIG. 2A. User interface 146a provides general video communication session controls 234 such as "Home", "Mute", "Stop Video", "Participants", "Chat", "Share Screen", "Record", and "Leave". User interface 146a provides camera/microphone setup controls 236 for a video communication session: (a) microphone muted/unmuted; (b) microphone selection; (c) camera on/off; (d) camera selection; (e) selected background filter; and (f) background status on/off. User interface 146a provides photobombing mitigation controls 238: (i) Automatic photobombing block on/off; (ii) automatic photobombing technique selection: (i) crop; (ii) blur; (iii) blur/filter; (iv) default; (v) base; and (vi) camera off. Baseline image 231 of local and/or raw image stream 192 includes primary image portion 240 representing local participant 194 (FIG. 2A) along with scene 242 of objects in a foreground or background to local participant 194 (FIG. 2A). Baseline image 231 can be cached for later use as a substitute image stream. Being similar to the same view at a later stage of the video communication session, presentation of baseline image 231 as a substitute for shared image stream 193 (FIG. 2A) can be unobtrusive.

Figure 3A:
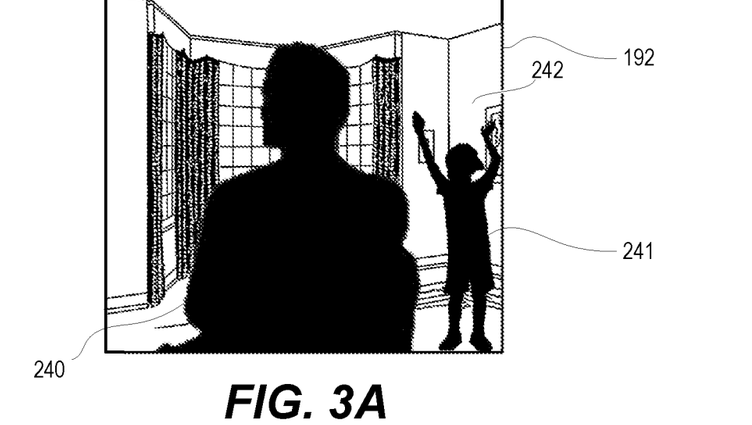
FIG. 3A depicts the image stream from the image capturing device incorporating a view of the participant and an uninvited person (non-participant), according to one or more embodiments.

FIG. 3A depicts local and/or raw image stream 192 from image capturing device 130a (FIG. 2A) incorporating primary image portion 240 representing local participant 194 (FIG. 2A) and secondary image portion 241 representing non-participant 195 (FIG. 2A). Local and/or raw image stream 192 occurs contemporaneous to FIG. 2A and later than FIG. 2B. Local and/or raw image stream 192 can include secondary image portion 241 of non-participant 195 (FIG. 2A) prior to filtering or when automatic photobombing blocking is disabled. According to one aspect of the disclosure, communication device 100 can mitigate the distraction to remote participant 213 (FIG. 2A) caused by the presence of non-participant 195 (FIG. 2A) by automatically communicating one of substitute image streams 196b-196e as shared image stream 193 to second communication devices 144 (FIG. 2A), respectively depicted in FIGS. 3B-3E. In addition, substitute image stream 196 (FIG. 1) can be baseline image 231 (FIG. 2A). In addition, instead of a default image, substitute image stream 196 (FIG. 1) can be a null or black image stream, where image capturing device 130a (FIG. 2A) is turned off or the image is not transmitted. Additionally, in one or more embodiments, controller 110 (FIG. 1) of communication device 100 can selectively mute microphone 132 (FIG. 2A). Muting can occur as long as the non-participant 195 (FIG. 2A) is detected as being present. Muting can occur if a detected voice is not recognized as being that of the participant 194, both when the non-participant 195 is visibly present in image stream and when the voice originates from a non-visible non-participant 195 (FIG. 2A) in the location. Muting can occur when participant 194 is speaking toward non-participant 195 (FIG. 2A).

Figure 3B:
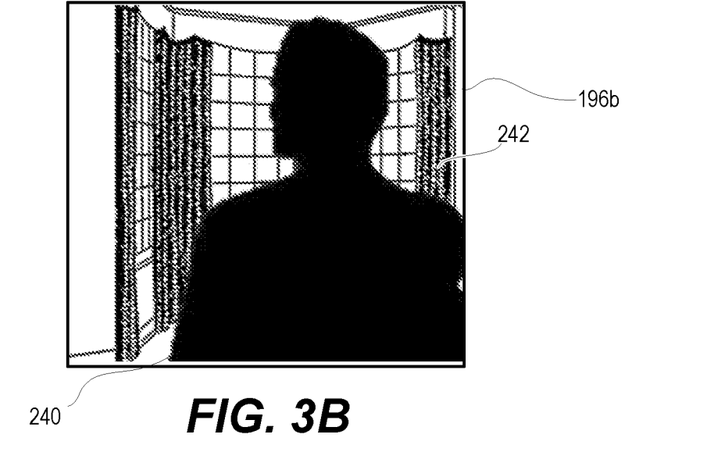
FIG. 3B depicts the image stream of FIG. 3A cropped to only incorporate a view of the participant, according to one or more embodiments.

Referring now to FIGS. 3B-3E, there are illustrated different versions of substitute image streams 196b-196e, respectively. FIGS. 3B-3E are described with on-going reference to FIG. 2A. FIG. 3B depicts substitute image stream 196b that is derived from local and/or raw image stream 192 (FIG. 1) from image capturing device 130a (FIG. 2A). Substitute image streams 196b-196e each incorporate primary image portion 240 that depicts local participant 194 but omits secondary image portion 241 that depicts non-participant 195 (FIG. 2A).

Referring now to FIG. 3B, which depicts substitute image stream 196b that is a cropped version of local and/or raw image stream 192 from image capturing device 130a (FIG. 2A). Substitute image stream 196b is cropped to only incorporate primary image portion 240 of local participant 194 of FIG. 2A. In one or more embodiments, image capturing device 130*b* can be selected to change the field of view, such as switching from a wide angle lens to a normal lens. In one or more embodiments, controller 110 (FIG. 1) causes image capturing device 130*a* to perform a mechanical or digital zoom that changes the field of view to exclude or obscure secondary image portion 241 of non-participant 195 (FIG. 2A) from local and/or raw image stream 192 (FIG. 1). In one or more embodiments, communication device 100 (FIG. 2A) electronically crops local and/or raw image stream 192 (FIG. 1) to provide only a portion of the field of view of image capturing device 130*a* (FIG. 2A).

Figure 3C:
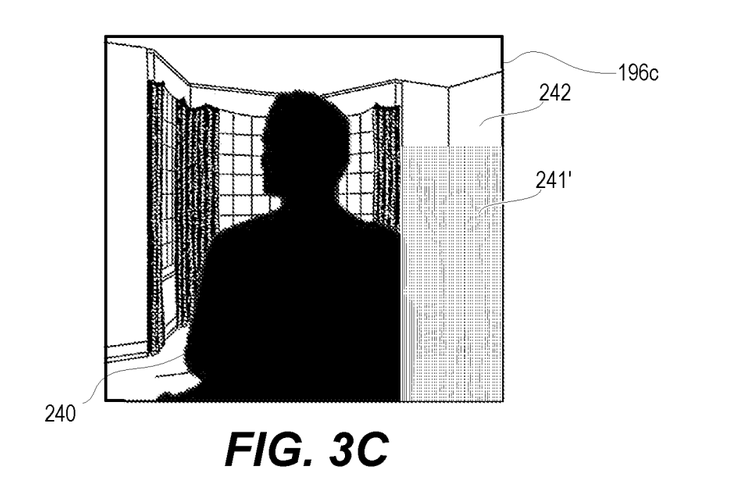
FIG. 3C depicts the image stream from FIG. 3A partially blurred to camouflage a view of the uninvited person, according to one or more embodiments.
Figure 3D:
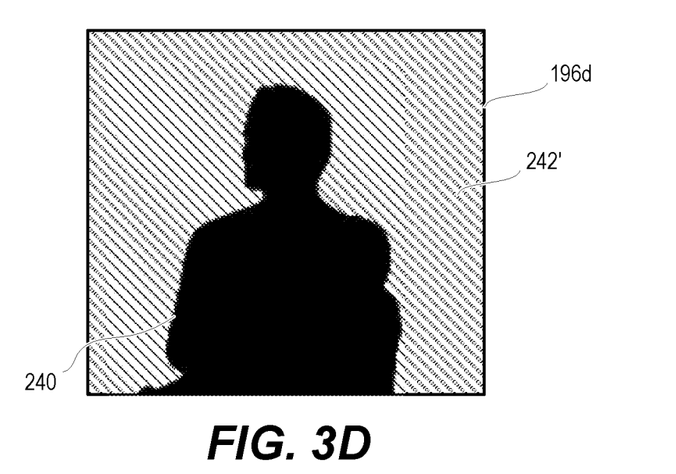
FIG. 3D depicts the image stream of FIG. 3C further altered by a video conferencing filter, according to one or more embodiments.

FIG. 3C depicts substitute image stream 196*c* from image capturing device 130*a* (FIG. 2A) that has a partially blurred secondary image portion 241' to camouflage non-participant 195 of FIG. 2A. Primary image portion 240 depicting local participant 194 of FIG. 2A remains visible. As one example implementation, a spatial low pass filter can visually blend secondary image portion 241 (FIG. 3A) of non-participant 195 of FIG. 2A with the surrounding background images of scene 242. Other image adjustments can be made to dim and/or deemphasize secondary image portion 241 (FIG. 3A) corresponding to non-participant 195 (FIG. 2A). In one or more embodiments, blurring of secondary image portion 241 (FIG. 3A) to present blurred secondary image portion 241' enables subsequent use of video conferencing filter 124 (FIG. 1) that substitutes the background (scene 242) with alternate scene 242' (FIG. 3D). FIG. 3D depicts substitute image stream 196*d* further altered by video filter 124 (FIG. 1). In one or more embodiments, video filter 124 (FIG. 1) lacks tracking of primary image portion 240 from baseline image 231. Thus, video filter 124 (FIG. 1) would include both primary image portion 231 and secondary image portion 241 (FIG. 3A) in a filtered version of local and/or raw image stream 192 (FIG. 1). By inputting blurred secondary image portion 241' to video filter 124 (FIG. 1), primary image portion 240 remains against alternate scene 242' but video filter 124 (FIG. 1) blocks blurred secondary image portion 241' as being part of scene 242 (FIG. 3C). In one or more embodiments, video conferencing application 114 (FIG. 1) incorporates an improved video conferencing filter that benefits from identification of secondary image portion 241 as distinct from primary image portion 240 by directly replacing secondary image portion 241 and scene 242 of FIG. 3A with alternate scene 242'.

Figure 3E:
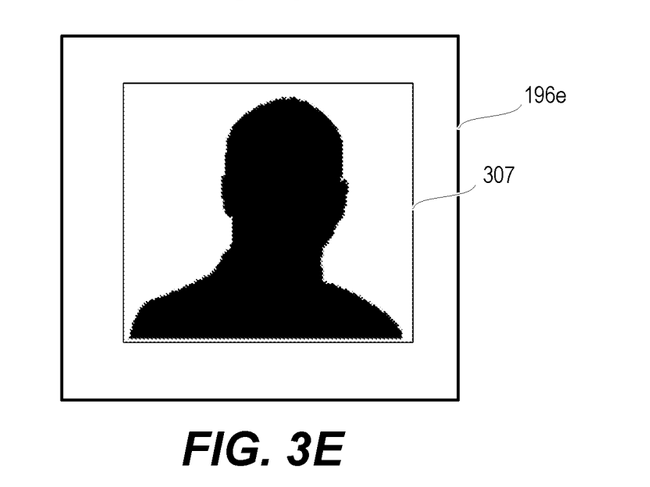
FIG. 3E depicts an alternate image that is sent to the video communication session in lieu of the image stream, according to one or more embodiments.

FIG. 3E depicts substitute image stream 196*e* of stored content 307 that is sent to the video communication session as shared image stream 193 (FIG. 1). Stored content 307 of substitute image stream 196*e* can be a profile photograph, an avatar, looped video segment, or a graphic that is used when the image capturing device 130*a* of FIG. 2A is turned off either manually or autonomously in response to detecting the secondary image portion 240 (FIG. 3A).

Figure 4:
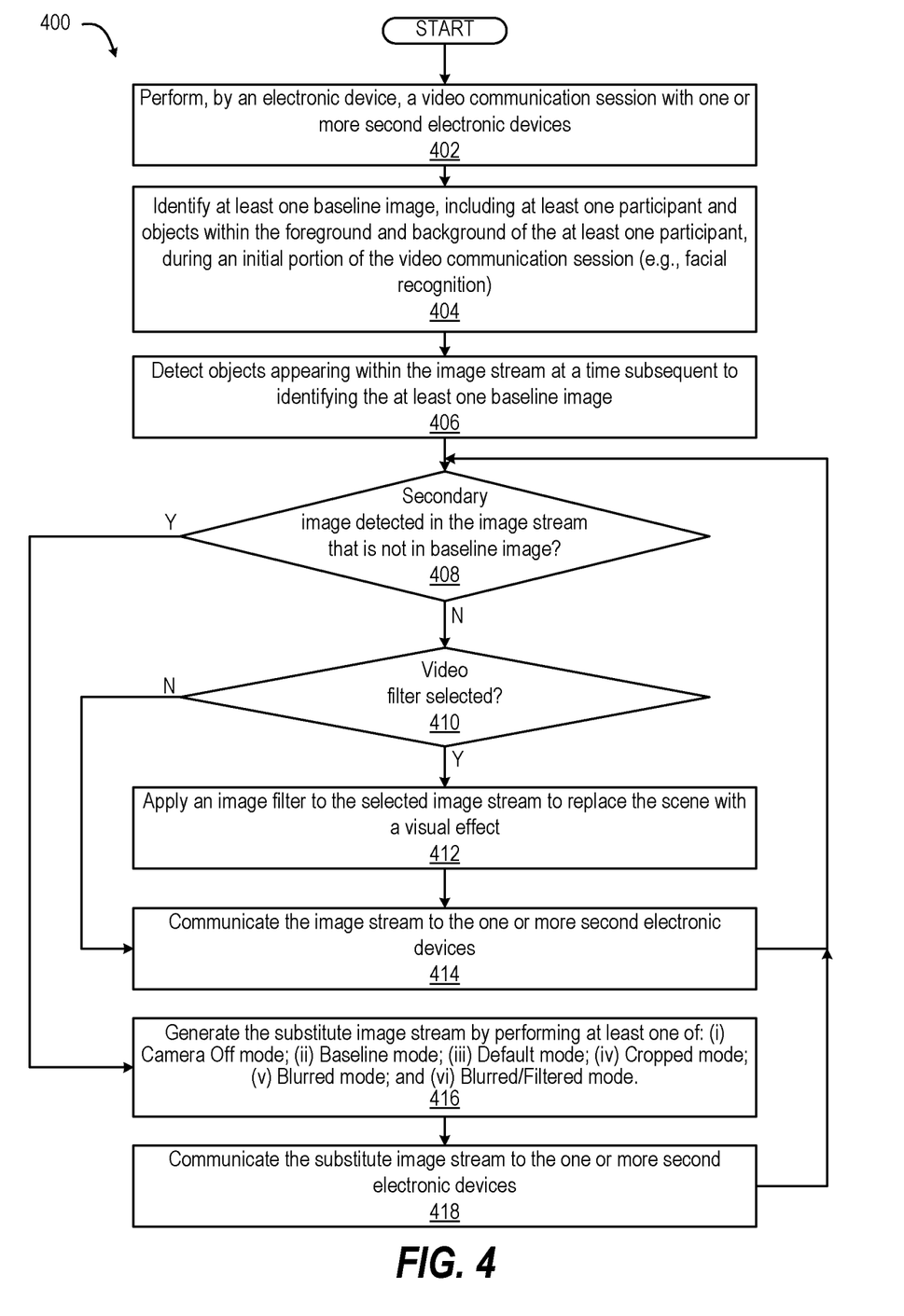
FIG. 4 presents a flow diagram of a method for autonomously blocking presentation of non-participants from appearing within an image stream transmitted during a video communication session from an electronic device to one or more second electronic devices, according to one or more embodiments.

FIG. 4 presents a flow diagram of method 400 for autonomously blocking presentation of non-participants from appearing within an image stream transmitted during a video communication session from an electronic device to one or more second electronic devices. In particular, method 400 involves managing, by an electronic device such as communication device 100 (FIG. 1), which content is included within an image stream captured by the device during a video communication session to mitigate or obscure the presence of a non-participant within the field of view of a camera of communication device 100 (FIG. 1). In at least one embodiment, communication device 100, managed by controller 110, executes video conference application 114 (FIG. 1) to facilitate the communication session. The description of method 400, as well as method 500 discussed below with regard to FIG. 5, are provided with general reference to the specific components illustrated within the preceding FIGS. 1, 2A-2B, and 3A-3E, and specific components referenced in methods 400 and 500 can be identical or similar to components of the same name used in describing preceding FIGS. 1, 2A-2B, and 3A-3E.

Method 400 includes performing, by an electronic device, a video communication session with one or more second electronic devices (block 402). Method 400 includes identifying, by the electronic device, at least one primary image portion, including at least one participant and objects within the foreground and background of the at least one participant, during an initial portion of the video communication session (block 404). In one or more embodiments, the controller looks for people or animals that appear or move within or against a background. In one or more embodiments, the electronic device is docked in a stationary position with at least one camera having a field of view that incorporates an image of a participant in a video communication session. In one or more embodiments, the scene is stationary or differs in color or distance from the foreground, thus enabling the controller to differentiate foreground objects from the background. In one or more embodiments, method 400 includes identifying at least one participant within the image stream during an initial portion of the video communication session (e.g., by utilizing facial recognition. The at least one participant can be one person, two people, a person, and/or an animal, etc. Method 400 includes detecting objects appearing within the image stream at a time subsequent to identifying the at least one baseline image (block 406). Method 400 includes determining whether a secondary image portion containing a non-participant or object is subsequently detected in the image stream (decision block 408). In response to detecting the secondary image portion subsequently appearing within the image stream, method 400 proceeds to block 416.

In response to not detecting a secondary image portion subsequently appearing within the image stream, method 400 includes determining whether a video filter is selected (decision block 410). A video filter alters an image feed by replacing the scene with a visual effect. The primary image portion, including the participant, are identified, and left in the image stream. In one or more embodiments, the video filter can add an overlay such as exaggerated human or animal facial features. For clarity, method 400 describes using a video filter to substitute an alternate scene around a participant after detection and blocking of a secondary image portion of a non-participant has occurred. In the depicted two-step technique, existing filters that operate on a current image stream can be used. Cropping and blurring or other imaging techniques to de-accentuate the secondary image portion can make the secondary image portion indistinguishable from the scene, allowing use of conventional video filters. In one or more embodiments, video filtering can be improved by using baseline image detection and subsequent tracking of a primary image portion such that both a secondary image portion and the scene can both be replaced with an alternate scene even if the secondary image portion moves and is clearly visually distinguishable from the scene.

In response to determining that the video filter is selected, method 400 includes applying the image filter to the image stream to replace the scene with a visual effect (block 412). Method 400 includes communicating the image stream to the one or more second electronics (block 414). Then method 400 returns to block 408. In response to determining that the video filter is not selected, method 400 proceeds to block 414.

In response to detecting a secondary image portion subsequently appearing within the image stream in decision block 408, method 400 includes generating a substitute image stream (block 416). According to a plurality of different embodiments, generating the substitute image stream includes performing or activating at least one of: (i) "Camera Off" mode by turning off the at least one image capturing device to communicate a null image stream; (ii) Baseline mode by communicating a portion of the image stream buffered from prior to an appearance of the secondary image portion; (iii) Default mode by communicating a saved default image; (iv) Cropped mode by one of adjusting camera controls for the at least one image capturing device to remove the secondary image portion from a field of view; (v) Blurred mode by visually altering the secondary image portion to be less distinguishable from the scene; and (vi) Blurred/Filtered mode by applying an image filter after the Blurred mode. According to additional embodiments, generating the substitute image stream includes (vii) selecting a different one of the at least one image capturing devices to record a different field of view, (viii) adjusting a zoom of the at least one image capturing device, and/or (ix) digitally cropping the image stream. Method 400 then includes communicating the substitute image stream to the one or more second electronic devices while the non-participant is visible within the field of view (block 418). Then method 400 returns to decision block 408.

Figure 5A:
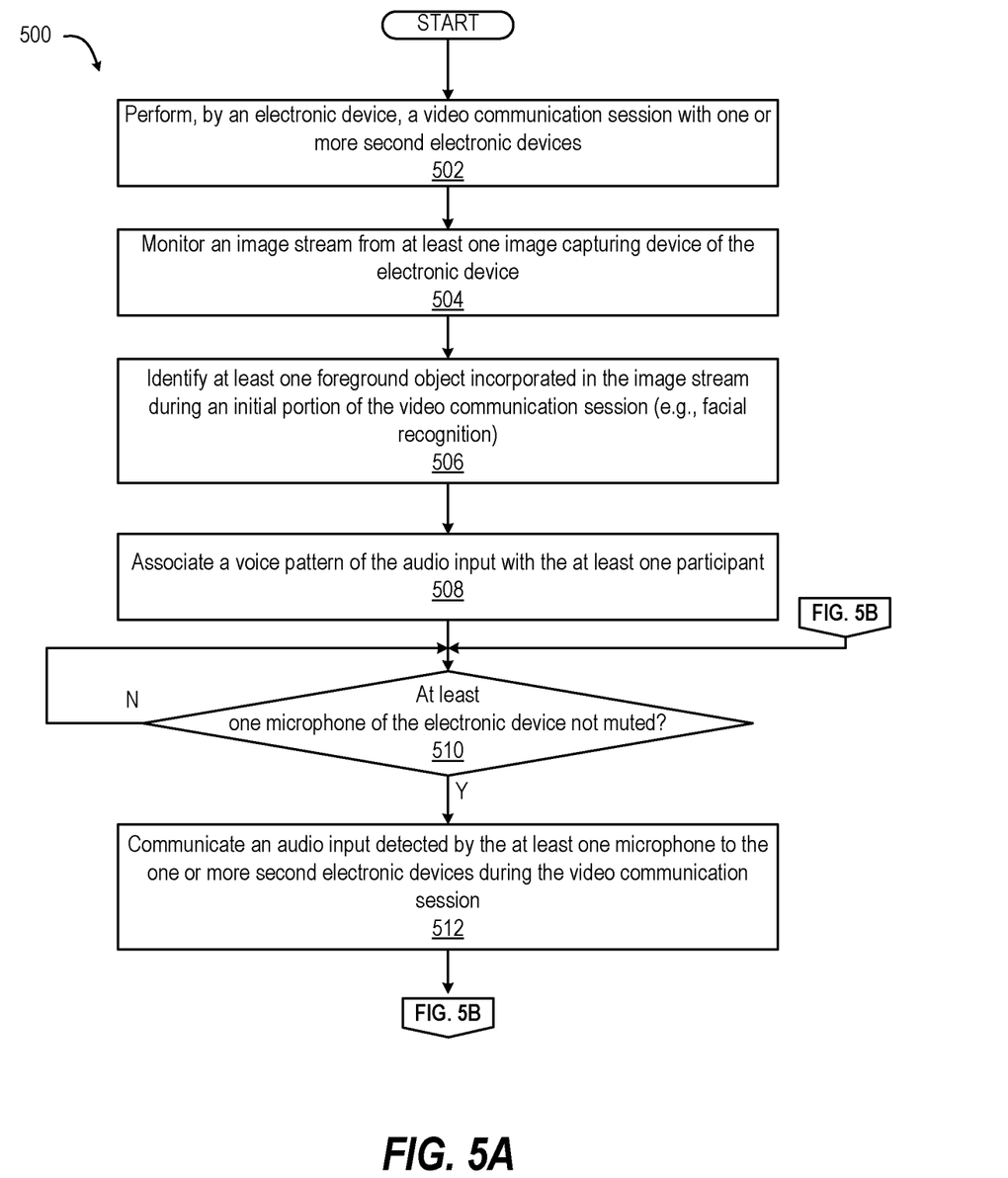
FIGS. 5A-5B (FIG. 5) present a flow diagram of a method for automatically muting a microphone of electronic device to avoid transmission of audio input detected from non-participants to the video communication session, according to one or more embodiments.
Figure 5B:
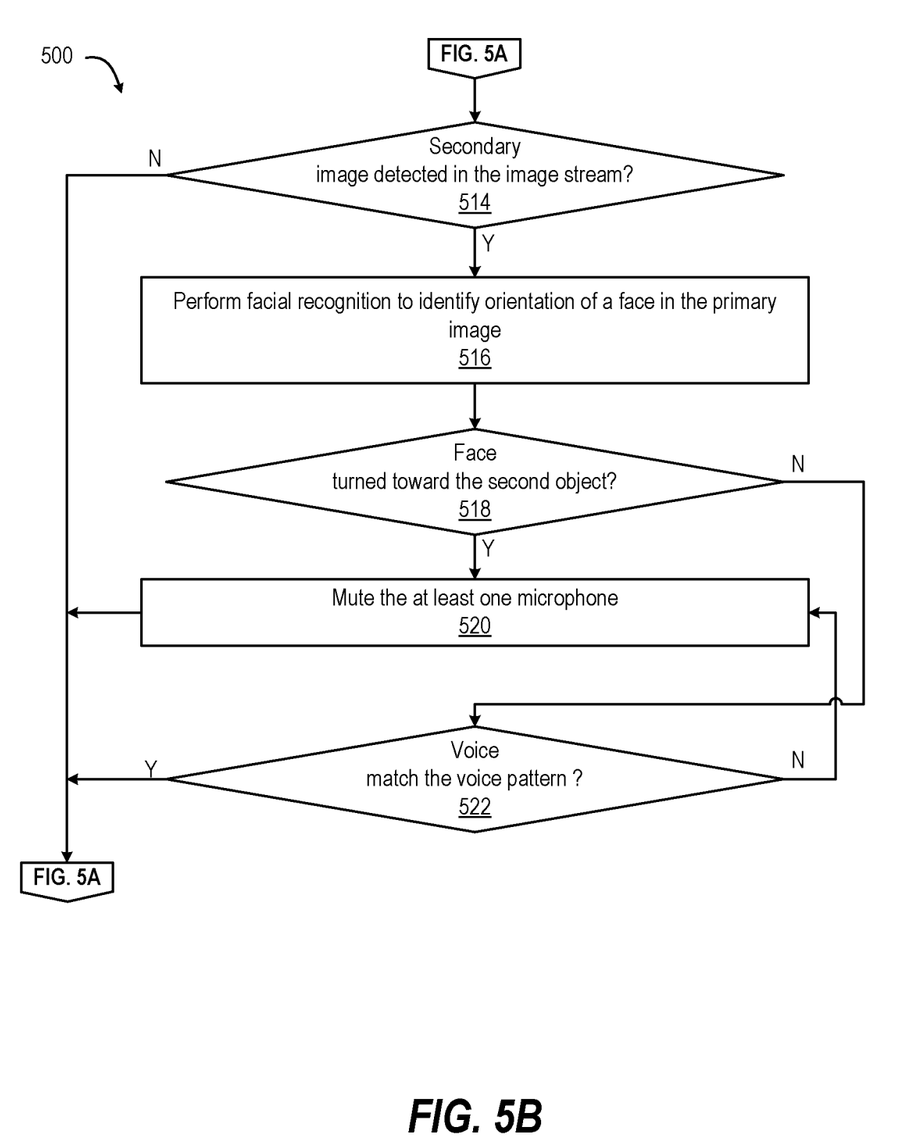

FIGS. 5A-5B (FIG. 5) present a flow diagram of method 500 for automatically muting a microphone of electronic device when avoiding presentation of the certain objects. With reference to FIG. 5A, method 500 includes performing, by an electronic device, a video communication session with one or more second electronic devices (block 502). Method 500 includes monitoring an image stream from at least one image capturing device of the electronic device (block 504). Method 500 includes identifying a primary image portion of at least one participant incorporated in the image stream during an initial portion of the video communication session (block 506). In one or more embodiments, method 500 includes associating a voice pattern of the audio input with the at least one participant (block 508). Method 500 includes determining whether at least one microphone of the electronic device is not muted (decision block 510). In response to determining that all microphones of the electronic device are muted, method 500 returns to block 510. In response to determining that at least one microphone of the electronic device is not muted, method 500 includes communicating an audio input detected by the at least one microphone to the one or more second electronic devices during the video communication session (block 512).

With reference to FIG. 5B, method 500 includes determining whether a secondary image portion is detected in the image stream (decision block 514). In response to determining that a secondary image portion is not detected in the image stream, method 500 returns to block 502 (FIG. 5A). In response to detecting a secondary image portion subsequently appearing within the image stream, method 500 includes performing facial recognition to identify orientation of a face in the primary image portion (block 516) and determining whether the face is turned toward the secondary image portion (decision block 518). In response to determining that the face is turned toward the secondary image portion, method 500 includes muting the at least one microphone to prevent transmission of speech not intended for the video communication session (block 520). Method 500 returns to block 510 (FIG. 5A).

In response to determining that the face of the at least one first foreground object is not turned toward the secondary image portion, method 500 includes determining whether a voice detected in the audio input matches the voice pattern associating with the at least one participant (decision block 522). In response to determining the voice does not match the voice pattern, method 500 proceeds to block 520. In response to determining the voice does match the voice pattern, method 500 returns to block 510 (FIG. 5A).

In one or more embodiments, method 400 further includes muting the microphone whenever the secondary image portion is detected to prevent disruptions that may occur with conversations involving the non-participant. In one or more embodiments, method 400 includes presenting a notification of the automatic muting to prompt a manual unmuting by the local participant in order for the local participant to speak during the detected presence of the secondary image portion.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   at least one image capturing device that provides an image stream; and
   a controller communicatively coupled to the at least one image capturing device, and which:
      during a video communication session with one or more second electronic devices, identifies at least one baseline image from the image stream, including a primary image portion of at least one participant and including a scene of objects within the foreground or background of the at least one participant, during an initial portion of the video communication session;
      monitors the image stream for a subsequent detection/appearance of the primary image portion and of at least one non-participant or object as a secondary image portion that is not included within the baseline image; and
      responds to detecting the secondary image portion subsequently appearing within the image stream by:
         determining whether a video filter mode is selected;
         in response to the video filter mode being selected, the controller:
            replaces the image stream with a substitute image stream by performing at least one of: (i) turning off the at least one image capturing device to communicate a null image stream; (ii) communicating an initial time portion of the image stream buffered from prior to an appearance of the secondary image portion at a subsequent time; and (iii) communicating a saved default image in place of the image stream; and
            generates the substitute image stream, wherein the controller: identifies that the electronic device is received in a dock that maintains positioning of the at least one image capturing device as docked in a stationary position; and in response to identifying that the electronic device is received in the dock, adjusts the camera controls by selecting a different one of the at least one image capturing devices to record a different field of view; and
            communicating, to the one or more second electronic devices, the substitute image stream that does not present the secondary image portion.

2. The electronic device of claim 1, wherein the controller generates the substitute image stream at least in part by adjusting camera controls for the at least one image capturing device to remove the secondary image portion from a field of view.

3. The electronic device of claim 1, wherein to replace the scene, the controller:
   applies an image filter to the image stream to replace the scene with a visual effect; and
   generates the substitute image stream by visually altering the secondary image portion to be less distinguishable from the scene prior to applying the image filter.

4. The electronic device of claim 1, further comprising at least one microphone communicatively coupled to the controller, wherein the controller:
   in response to determining that the at least one microphone is not muted, communicates an audio input detected by the at least one microphone to the one or more second electronic devices during the video communication session; and
   mutes the at least one microphone in response to detecting the secondary image portion appearing within the image stream.

5. The electronic device of claim 4, wherein the controller:
   prior to detecting the secondary image portion appearing within the image stream, associates a voice pattern of the audio input with the at least one participant; and
   in response to detecting the secondary image portion appearing within the image stream:
      compares a voice in the audio input to the voice pattern associated with the at least one participant;
      communicates the voice to the one or more second electronic devices in response to the voice matching the voice pattern; and
      mutes the at least one microphone further in response to the voice not matching the voice pattern.

6. The electronic device of claim 4, wherein the controller:
   performs facial recognition of the primary image portion to identify an orientation of a face; and
   in response to detecting the secondary image portion appearing within the image stream:
      determines whether the face of the primary image portion is turned toward the secondary image portion; and
      mutes the at least one microphone further in response to determining that the face is turned toward the secondary image portion.

7. The electronic device of claim 1, further comprising:
   a display and one or more input devices communicatively coupled to the controller;
   a memory coupled to the controller and having a video conference application; and
   wherein the controller processes code of the video conference application to generate a user interface presented on the display, the user interface comprising:
      a baseline image captured by the at least one image capturing device before the secondary image portion is detected in the image stream; and
      photobombing mitigation controls that include a selectable option for enabling and disabling automatic photobombing blocking.

8. The electronic device of claim 7, wherein the automatic photobombing mitigation controls comprises (i) automatic photobombing block on/off selection; and (ii) automatic photobombing technique selection from among crop, blur, blur/filter, default, base, and camera off.

9. A method comprising:
- during a video communication session with one or more second electronic devices, identifying at least one baseline image from the image stream, including a primary image portion of at least one participant and including a scene of objects within the foreground or background of the at least one participant, during an initial portion of the video communication session;
- monitoring the image stream for a subsequent detection of the primary image portion and of at least one non-participant or object as a secondary image portion that is not included within the baseline image; and
- responding to detecting the secondary image portion subsequently appearing within the image stream by:
  - determining whether a video filter mode is selected;
  - in response to the video filter mode being selected:
    - replacing the image stream with a substitute image stream by performing at least one of: (i) turning off the at least one image capturing device to communicate a null image stream; (ii) communicating an initial time portion of the image stream buffered from prior to an appearance of the secondary image portion at a subsequent time; and (iii) communicating a saved default image in place of the image stream; and
    - generating the substitute image stream by: identifying whether the electronic device is received in a dock that maintains positioning of the at least one image capturing device as docked in a stationary position; and in response to identifying that the electronic device is received in the dock, adjusting the camera controls by selecting a different one of the at least one image capturing devices to record a different field of view; and
  - communicating, to the one or more second electronic devices, the substitute image stream that does not present the secondary image portion.

10. The method of claim 9, wherein generating the substitute image stream at least in part comprises adjusting camera controls for the at least one image capturing device to remove the secondary image portion from a field of view by selecting a different one of the at least one image capturing devices to record a different field of view.

11. The method of claim 9, wherein replacing the scene further comprises applying an image filter to the image stream to replace the scene with a visual effect, wherein generating the substitute image stream comprises visually altering the secondary image portion to be less distinguishable from the scene prior to applying the image filter.

12. The method of claim 9, further comprising:
- in response to determining that at least one microphone of the electronic device is not muted, communicating an audio input detected by the at least one microphone to the one or more second electronic devices during the video communication session; and
- muting the at least one microphone in response to detecting the secondary image portion appearing within the image stream.

13. The method of claim 12, further comprising:
- prior to detecting the secondary image portion appearing within the image stream, associating a voice pattern of the audio input with the at least one participant; and
- in response to detecting the secondary image portion appearing within the image stream:
  - comparing a voice in the audio input to the voice pattern associated with the first foreground object;
  - communicating the voice to the one or more second electronic devices in response to the voice matching the voice pattern; and
  - muting the at least one microphone further in response to the voice not matching the voice pattern.

14. The method of claim 12, further comprising:
- performing facial recognition of the primary image portion to identify orientation of a face; and
- in response to detecting the secondary image portion appearing within the image stream:
  - determining whether the face of the primary image portion is turned toward the secondary image portion; and
  - muting the at least one microphone in response to determining that the face is turned toward the secondary image portion.

15. A computer program product comprising:
- a computer readable storage device; and
- program code on the computer readable storage device that when executed by a processor associated with an electronic device, the program code enables the electronic device to provide functionality of:
  - during a video communication session with one or more second electronic devices, identifying at least one baseline image from the image stream, including a primary image portion of at least one participant and including a scene of objects within the foreground or background of the at least one participant, during an initial portion of the video communication session;
  - monitoring the image stream for a subsequent detection of the primary image portion and of at least one non-participant or object as a secondary image portion that is not included within the baseline image; and
  - responding to detecting the secondary image portion subsequently appearing within the image stream by:
    - determining whether a video filter mode is selected;
    - in response to the video filter mode being selected:
      - replacing the image stream with a substitute image stream by performing at least one of: (i) turning off the at least one image capturing device to communicate a null image stream; (ii) communicating an initial time portion of the image stream buffered from prior to an appearance of the secondary image portion at a subsequent time; and (iii) communicating a saved default image in place of the image stream; and
      - generating the substitute image stream by: identifying whether the electronic device is received in a dock that maintains positioning of the at least one image capturing device as docked in a stationary position; and in response to identifying that the electronic device is received in the dock, adjusting the camera controls by selecting a different one of the at least one image capturing devices to record a different field of view; and
    - communicating, to the one or more second electronic devices, the substitute image stream that does not present the secondary image portion.

16. The computer program product of claim 15, wherein the program code enables the electronic device to provide the functionality of generating the substitute image stream at least in part by selecting a different one of the at least one image capturing devices to remove the secondary image portion from a field of view.

\* \* \* \* \*